United States Patent
Jacobsen et al.

(10) Patent No.: US 11,432,254 B2
(45) Date of Patent: Aug. 30, 2022

(54) UE INITIATED PROPAGATION DELAY COMPENSATION MECHANISM

(71) Applicant: Nokia Technologies Oy, Espoo (FI)

(72) Inventors: Thomas H. Jacobsen, Nørresundby (DK); Ryan Keating, Chicago, IL (US); Johannes Harrebek, Aalborg (DK)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 17/007,572

(22) Filed: Aug. 31, 2020

(65) Prior Publication Data

US 2022/0070808 A1 Mar. 3, 2022

(51) Int. Cl.
*H04W 56/00* (2009.01)

(52) U.S. Cl.
CPC ..... *H04W 56/0045* (2013.01); *H04W 56/003* (2013.01); *H04W 56/0005* (2013.01); *H04W 56/0035* (2013.01); *H04W 56/0055* (2013.01); *H04W 56/0065* (2013.01)

(58) Field of Classification Search
CPC ................................................ H04W 4/02–029
See application file for complete search history.

(56) References Cited

U.S. PATENT DOCUMENTS

| | | | | |
|---|---|---|---|---|
| 2006/0280226 A1* | 12/2006 | Krasner | ............... | H04W 56/006 375/130 |
| 2016/0029333 A1 | 1/2016 | Seo et al. | | |
| 2016/0301486 A1* | 10/2016 | Joey | ...................... | H04B 17/318 |
| 2017/0346685 A1* | 11/2017 | Wang | ..................... | H04L 5/0091 |
| 2018/0295595 A1 | 10/2018 | Shellhammer et al. | | |
| 2019/0191403 A1 | 6/2019 | Goel et al. | | |
| 2020/0229016 A1* | 7/2020 | Manolakos | ........... | H04L 5/0048 |

FOREIGN PATENT DOCUMENTS

| WO | WO-2019/201438 A1 | 10/2019 |
|---|---|---|
| WO | WO-2020/031113 A1 | 2/2020 |

OTHER PUBLICATIONS

Hsiao-Hwa Chen et al. "Isotropic Air-Interface in TD-SCDMA; Uplink Synchronization Control and its Environment-Dependent Performance Analysis" 2003 IEEE 58$^{th}$ Vehicular Technology Conference. VTC 2003-Fall. Oct. 6-9, 2003.

* cited by examiner

*Primary Examiner* — San Htun
(74) *Attorney, Agent, or Firm* — Joseph C. Drish; Harrington & Smith

(57) ABSTRACT

Methods, apparatuses, and computer programs are provided for propagation delay compensation. A method for a UE includes receiving a configuration to provide a propagation delay notification for a propagation delay estimation; determining when the notification should be transmitted; transmitting the propagation delay notification; and determining a corresponding action based on the configuration of a relation between uplink reference signals and downlink reference signals. Methods are also provided for a radio node such as a base station.

31 Claims, 8 Drawing Sheets

|  | UL_REF | | |
|---|---|---|---|
|  | 0 | 1 | 2 |
| 0 | X |  | X |
| 1 |  |  |  |
| 2 |  | X |  |

DL_REF

FIG.3

UE INITIATED PROPAGATION DELAY COMPENSATION MECHANISM

TECHNICAL FIELD

The examples and non-limiting embodiments relate generally to communications and, more particularly, to a UE initiated propagation delay compensation mechanism.

BACKGROUND

It is known to synchronize communication between a user equipment and a radio node in a wireless network.

SUMMARY

The following summary is merely intended to be an example. The summary is not intended to limit the scope of the claims.

An example method includes receiving a configuration to provide a propagation delay notification for a propagation delay estimation; determining when the notification should be transmitted; transmitting the propagation delay notification; and determining a corresponding action based on the configuration of a relation between uplink reference signals and downlink reference signals.

Another example method includes providing a configuration to provide a propagation delay notification for a propagation delay estimation; and receiving the propagation delay notification; wherein the configuration comprises a relation between uplink reference signals and downlink reference signals.

An example apparatus includes at least one processor; and at least one non-transitory memory including computer program code; wherein the at least one memory and the computer program code are configured to, with the at least one processor, cause the apparatus at least to perform: receive a configuration to provide a propagation delay notification for a propagation delay estimation; determine when the notification should be transmitted; transmit the propagation delay notification; and determine a corresponding action based on the configuration of a relation between uplink reference signals and downlink reference signals.

BRIEF DESCRIPTION OF THE DRAWINGS

The foregoing aspects and other features are explained in the following description, taken in connection with the accompanying drawings, wherein:

FIG. 3 is an example of a mapping table between UL_Ref and DL_Ref.

DETAILED DESCRIPTION OF EXAMPLE EMBODIMENTS

Figure 1:
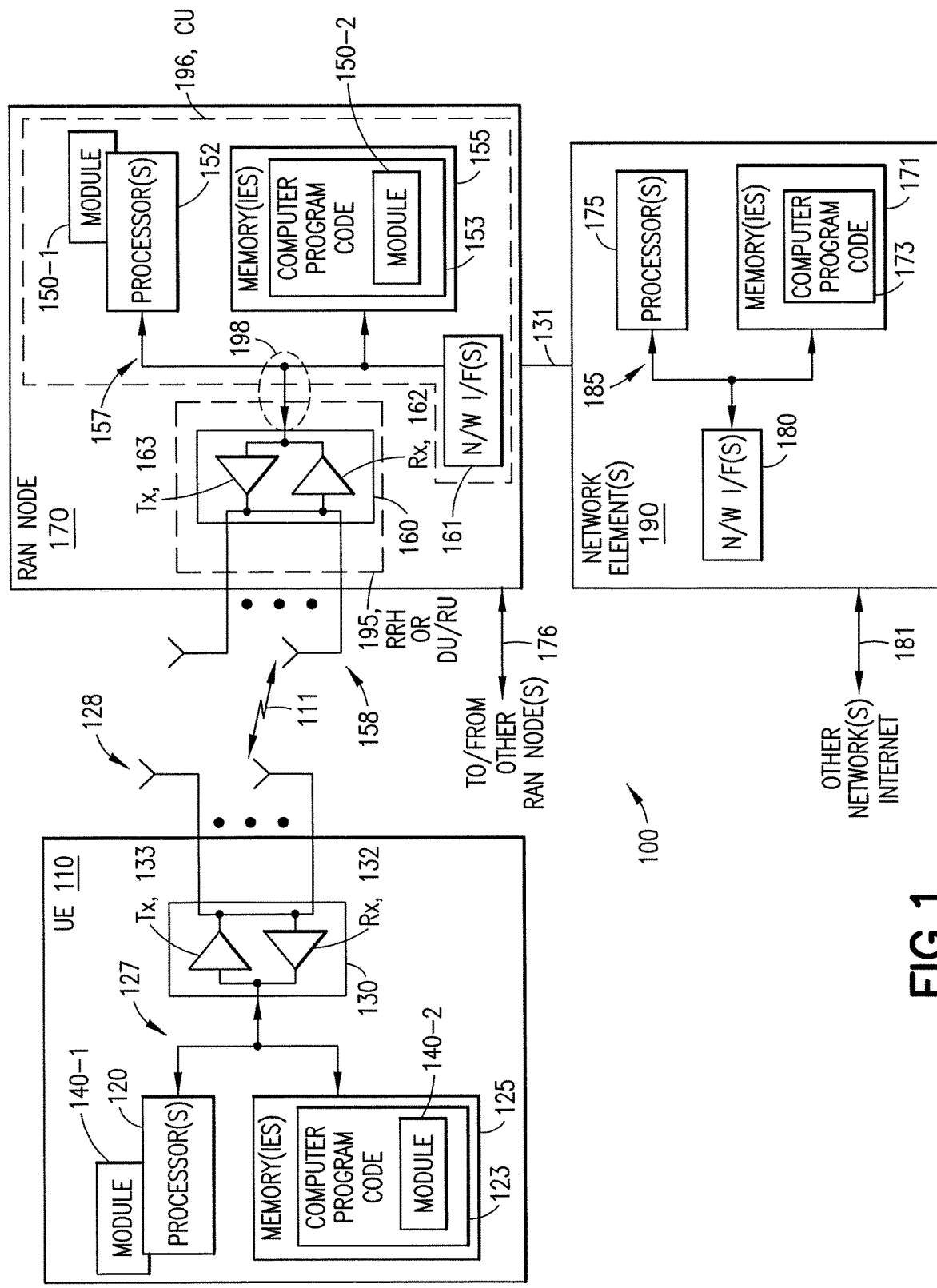
FIG. 1 is a block diagram of one possible and non-limiting system in which the example embodiments may be practiced.

The following acronyms and abbreviations that may be found in the specification and/or the drawing figures are defined as follows:

3GPP third generation partnership project
4G fourth generation
5G fifth generation
5GC 5G core network
ACK acknowledgement
Alt alternative
AMF access and mobility management function
AoA angle of arrival
A-SRS aperiodic SRS
BW bandwidth
CE control element
CG configured grant
CN core network
CP cyclic prefix
CSI channel state/status information
CU central unit or centralized unit
DCI downlink control information
DL downlink
DL_Ref downlink reference signal
DMRS or DM-RS demodulation reference signal
DU distributed unit
DSP digital signal processor
E-CID enhanced cell-ID
eNB evolved Node B (e.g., an LTE base station)
EN-DC E-UTRA-NR dual connectivity
en-gNB node providing NR user plane and control plane protocol terminations towards the UE, and acting as a secondary node in EN-DC
E-UTRA evolved universal terrestrial radio access, i.e., the LTE radio access technology
F1 control interface between CU and DU
FFS for further study
FS_ Rel-17 study
gNB base station for 5G/NR, i.e., a node providing NR user plane and control plane protocol terminations towards the UE, and connected via the NG interface to the 5GC
GPS global positioning system
HARQ hybrid automatic repeat request
I/F interface
ID identifier
IE information element
I/O input/output
IoT Internet of Things
IIoT Industrial Internet of Things
LCH logical channel
LMF location management function
LPP LTE positioning protocol
LTE long term evolution (4G)
MAC medium access control
MME mobility management entity
MSG2 message 2 in two step RACH
MSG4 message 4 in four step RACH
Multi-RTT multi-cell round trip time
NAS non-access stratum
ng or NG new generation
ng-eNB new generation eNB NG-RAN new generation radio access network
NLOS non-line-of-sight
NR new radio (5G)
NRPPa new radio positioning protocol A
N/W or NW network
PD propagation delay
PDCP packet data convergence protocol
PHY physical layer
PRS positioning reference signal
P-SRS periodic SRS
PUCCH physical uplink control channel
PUSCH physical uplink shared channel
R# 3GPP RAN #/R# 3GPP working group, or release
RACH random access channel
RAN radio access network
RAN# RAN WG# or radio layer #
RAR random access response
refSFN system frame number reference
Rel- release
RF radio frequency
RLC radio link control
RP- 3GPP RAN
RRC radio resource control
RRH remote radio head
RS reference signal
RSTD reference signal time difference
RTC real time clock
RTT round trip time
RU radio unit
Rx or RX receiver or interchangeably receive
SA# service and system aspects working group #
SCS subcarrier spacing
SDAP service data adaptation protocol
SGW serving gateway
SIB9 system information block 9, having information related to GPS time and coordinated universal time (UTC)
SIP session initiation protocol
SMF session management function
SPS semi-persistent scheduling
SR scheduling request
SRS sounding reference signal
SSB synchronization signal block
TA timing advance
TAC timing advance command
ToD time of day
TO timing offset
TRP transmission and reception point
TSC time sensitive communication(s)
TSN time sensitive networking/networks
Tx or TX transmitter or interchangeably transmit
UCI uplink control information
UE user equipment (e.g., a wireless, typically mobile device)
UL uplink
UL_Ref uplink reference signal
UPF user plane function
UTC coordinated universal time
Uu radio interface between the mobile and the radio access network
WG working/work group Turning to FIG. 1, this figure shows a block diagram of one possible and non-limiting example in which the examples may be practiced. A user equipment (UE) 110, radio access network (RAN) node 170, and network element(s) 190 are illustrated. In the example of FIG. 1, the user equipment (UE) 110 is in wireless communication with a wireless network 100. A UE is a wireless device that can access the wireless network 100. The UE 110 includes one or more processors 120, one or more memories 125, and one or more transceivers 130 interconnected through one or more buses 127. Each of the one or more transceivers 130 includes a receiver, Rx, 132 and a transmitter, Tx, 133. The one or more buses 127 may be address, data, or control buses, and may include any interconnection mechanism, such as a series of lines on a motherboard or integrated circuit, fiber optics or other optical communication equipment, and the like. The one or more transceivers 130 are connected to one or more antennas 128. The one or more memories 125 include computer program code 123. The UE 110 includes a module 140, comprising one of or both parts 140-1 and/or 140-2, which may be implemented in a number of ways. The module 140 may be implemented in hardware as module 140-1, such as being implemented as part of the one or more processors 120. The module 140-1 may be implemented also as an integrated circuit or through other hardware such as a programmable gate array. In another example, the module 140 may be implemented as module 140-2, which is implemented as computer program code 123 and is executed by the one or more processors 120. For instance, the one or more memories 125 and the computer program code 123 may be configured to, with the one or more processors 120, cause the user equipment 110 to perform one or more of the operations as described herein. The UE 110 communicates with RAN node 170 via a wireless link 111. The modules 140-1 and 140-2 may be configured to implement the functionality of the UE as described herein.

The RAN node 170 in this example is a base station that provides access by wireless devices such as the UE 110 to the wireless network 100. The RAN node 170 may be, for example, a base station for 5G, also called New Radio (NR). In 5G, the RAN node 170 may be a NG-RAN node, which is defined as either a gNB or an ng-eNB. A gNB is a node providing NR user plane and control plane protocol terminations towards the UE, and connected via the NG interface to a 5GC (such as, for example, the network element(s) 190). The ng-eNB is a node providing E-UTRA user plane and control plane protocol terminations towards the UE, and connected via the NG interface to the 5GC. The NG-RAN node may include multiple gNBs, which may also include a central unit (CU) (gNB-CU) 196 and distributed unit(s) (DUs) (gNB-DUs), of which DU 195 is shown. Note that the DU 195 may include or be coupled to and control a radio unit (RU). The gNB-CU 196 is a logical node hosting radio resource control (RRC), SDAP and PDCP protocols of the gNB or RRC and PDCP protocols of the en-gNB that controls the operation of one or more gNB-DUs. The gNB-CU 196 terminates the F1 interface connected with the gNB-DU 195. The F1 interface is illustrated as reference 198, although reference 198 also illustrates a link between remote elements of the RAN node 170 and centralized elements of the RAN node 170, such as between the gNB-CU 196 and the gNB-DU 195. The gNB-DU 195 is a logical node hosting RLC, MAC and PHY layers of the gNB or en-gNB, and its operation is partly controlled by gNB-CU 196. One gNB-CU 196 supports one or multiple cells. One cell is supported by only one gNB-DU 195. The gNB-DU 195 terminates the F1 interface 198 connected with the gNB-CU 196. Note that the DU 195 is considered to include the transceiver 160, e.g., as part of a RU, but some examples of this may have the transceiver 160 as part of a separate RU, e.g., under control of and connected to the DU 195. The RAN node 170 may also be an eNB (evolved NodeB) base station, for LTE (long term evolution), or any other suitable base station or node.

The RAN node 170 includes one or more processors 152, one or more memories 155, one or more network interfaces (N/W I/F(s)) 161, and one or more transceivers 160 interconnected through one or more buses 157. Each of the one or more transceivers 160 includes a receiver, Rx, 162 and a transmitter, Tx, 163. The one or more transceivers 160 are connected to one or more antennas 158. The one or more memories 155 include computer program code 153. The CU 196 may include the processor(s) 152, memory(ies) 155, and network interfaces 161. Note that the DU 195 may also contain its own memory/memories and processor(s), and/or other hardware, but these are not shown.

The RAN node 170 includes a module 150, comprising one of or both parts 150-1 and/or 150-2, which may be implemented in a number of ways. The module 150 may be implemented in hardware as module 150-1, such as being implemented as part of the one or more processors 152. The module 150-1 may be implemented also as an integrated circuit or through other hardware such as a programmable gate array. In another example, the module 150 may be implemented as module 150-2, which is implemented as computer program code 153 and is executed by the one or more processors 152. For instance, the one or more memories 155 and the computer program code 153 are configured to, with the one or more processors 152, cause the RAN node 170 to perform one or more of the operations as described herein. Note that the functionality of the module 150 may be distributed, such as being distributed between the DU 195 and the CU 196, or be implemented solely in the DU 195. The modules 150-1 and 150-2 may be configured to implement the functionality of the base station described herein. Such functionality of the base station may include a location management function (LMF) implemented based on functionality of the LMF described herein. Such LMF may also be implemented within the RAN node 170 as a location management component (LMC).

The one or more network interfaces 161 communicate over a network such as via the links 176 and 131. Two or more gNBs 170 may communicate using, e.g., link 176. The link 176 may be wired or wireless or both and may implement, for example, an Xn interface for 5G, an X2 interface for LTE, or other suitable interface for other standards.

The one or more buses 157 may be address, data, or control buses, and may include any interconnection mechanism, such as a series of lines on a motherboard or integrated circuit, fiber optics or other optical communication equipment, wireless channels, and the like. For example, the one or more transceivers 160 may be implemented as a remote radio head (RRH) 195 for LTE or a distributed unit (DU) 195 for gNB implementation for 5G, with the other elements of the RAN node 170 possibly being physically in a different location from the RRH/DU 195, and the one or more buses 157 could be implemented in part as, for example, fiber optic cable or other suitable network connection to connect the other elements (e.g., a central unit (CU), gNB-CU 196) of the RAN node 170 to the RRH/DU 195. Reference 198 also indicates those suitable network link(s).

It is noted that description herein indicates that "cells" perform functions, but it should be clear that equipment which forms the cell may perform the functions. The cell makes up part of a base station. That is, there can be multiple cells per base station. For example, there could be three cells for a single carrier frequency and associated bandwidth, each cell covering one-third of a 360 degree area so that the single base station's coverage area covers an approximate oval or circle. Furthermore, each cell can correspond to a single carrier and a base station may use multiple carriers. So if there are three 120 degree cells per carrier and two carriers, then the base station has a total of 6 cells.

The wireless network 100 may include a network element or elements 190 that may include core network functionality, and which provides connectivity via a link or links 181 with a further network, such as a telephone network and/or a data communications network (e.g., the Internet). Such core network functionality for 5G may include location management functions (LMF(s)) and/or access and mobility management function(s) (AMF(S)) and/or user plane functions (UPF(s)) and/or session management function(s) (SMF(s)). Such core network functionality for LTE may include MME (Mobility Management Entity)/SGW (Serving Gateway) functionality. These are merely example functions that may be supported by the network element(s) 190, and note that both 5G and LTE functions might be supported. The RAN node 170 is coupled via a link 131 to the network element 190. The link 131 may be implemented as, e.g., an NG interface for 5G, or an S1 interface for LTE, or other suitable interface for other standards. The network element 190 includes one or more processors 175, one or more memories 171, and one or more network interfaces (N/W I/F(s)) 180, interconnected through one or more buses 185. The one or more memories 171 include computer program code 173. The one or more memories 171 and the computer program code 173 are configured to, with the one or more processors 175, cause the network element 190 to perform one or more operations such as functionality of an LMF as described herein. In some examples, a single LMF could serve a large region covered by hundreds of base stations.

The wireless network 100 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization are still implemented, at some level, using hardware such as processors 152 or 175 and memories 155 and 171, and also such virtualized entities create technical effects.

The computer readable memories 125, 155, and 171 may be of any type suitable to the local technical environment and may be implemented using any suitable data storage technology, such as semiconductor based memory devices, flash memory, magnetic memory devices and systems, optical memory devices and systems, fixed memory and removable memory. The computer readable memories 125, 155, and 171 may be means for performing storage functions. The processors 120, 152, and 175 may be of any type suitable to the local technical environment, and may include one or more of general purpose computers, special purpose computers, microprocessors, digital signal processors (DSPs) and processors based on a multi-core processor architecture, as non-limiting examples. The processors 120, 152, and 175 may be means for performing functions, such as controlling the UE 110, RAN node 170, network element(s) 190, and other functions as described herein.

In general, the various embodiments of the user equipment 110 can include, but are not limited to, cellular telephones such as smart phones, tablets, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, tablets with wireless communication capabilities, as well as portable units or terminals that incorporate combinations of such functions.

UE 110, RAN node 170 and/or network element(s) 190 (and associated memories, computer program code and modules) may be configured to implement a propagation delay compensation mechanism, based on the examples described herein. Thus, computer program code 123, module 140-1, module 140-2, computer program code 153, module 150-1, module 150-2, and/or computer program code 173 may be configured to implement a propagation delay estimation mechanism, based on the examples described herein.

Accurate time synchronization is an addition in the Release-16 of the 3GPP 5G New Radio specifications in order to support Industrial IoT use-cases (IIoT) and, in particular, to support Time Sensitive Networking (TSN) or Time Sensitive Communications (TSC) applications. Time synchronization ensures that different nodes of a 5G network (e.g. UPF, gNB, UE) share the same Time of Day (ToD) clock, such as the UTC clock. The work on time synchronization continues in Release-17 as part of the FS_IIoT item in SA2 Work Group (WG) and NR_IIOT_URLLC_enh work item in RAN WGs.

Due to the dynamic nature of the radio link, it is challenging to deliver time synchronization over the Uu interface from the gNB to the UE. Using the 5G NR control plane, time synchronization information (i.e. the gNB clock) can be delivered from a gNB to served UEs using two methods: one is a broadcast method where the time information is encoded in a SIB9 message. SIB9 consists of a timeInfo IE and a referenceTimeInfor16 IE, where the former provides a ToD granularity of 10 μs, and the latter a ToD granularity of 10 ns which is an important one for accurate time synchronization use cases considered here. The other is a unicast method where the time information is encoded in a unicast RRC message. In both methods, the encoded time information is the gNB's clock time that corresponds to the ending boundary of a specific radio system frame (refSFN), where refSFN is indicated to the UE either implicitly (in case of broadcast) or explicitly (in case of unicast). When a UE receives the SIB9/RRC message, it associates the time information with its own refSFN boundary, which is aligned with the gNB's refSFN boundary. In this way, underlying 5G radio frame timing at the gNB and the UE is used as a common reference for delivery of the ToD clock.

A problem in using the underlying 5G radio frame timing at the gNB and UE as a common reference for delivery of the ToD clock is that radio frame boundaries (hence refSFN boundary) at the gNB and UE are not perfectly aligned in time with respect to one another. The downlink frame boundary at the UE is shifted by the propagation delay (i.e. by the time it takes for the radio frame to propagate from the gNB to the UE over the air) with respect to the corresponding frame boundary at the gNB. When a UE synchronizes its clock by associating time information carried by the SIB9/RRC message with its own refSFN boundary, its clock is delayed by the propagation delay compared to the gNB's clock. This may not be an issue if propagation delay is relatively small compared to the maximum allowed timing error. However, considering the maximum synchronization error over 5G RAN and that UE's distance from the gNB may be such that propagation delay alone would introduce a much larger error, mechanisms to compensate for this offset are needed. Therefore, UE needs to compensate the time information received in the SIB9/RRC message for the propagation delay, e.g. by adding its current PD estimate to the time information.

During the discussions and evaluations conducted in RAN1 [e.g. R1-1900935], it was assumed that the existing Timing Advance (TA) procedure could be used to obtain a PD estimation. However, the support for PD compensation is incomplete in Release-16, as nothing is specified on how (by TA or a new procedure) the PD estimate is obtained or who/what entity (UE or NW) applies the PD compensation. Both remain to be solved in Release-17. A strong reason behind the agreements from RAN2#109-e, seen in the light of otherwise strong arguments for specifying how and who, is that some companies question the usage of TA for PD compensation, and want to study a new procedure dedicated for PD compensation (an example of such argumentation can be found in [R2-2000786]).

As part of the NR positioning support that was introduced in Rel-16 (RP-190752), one positioning solution was multi-cell round trip time (multi-RTT). In multi-RTT the gNBs transmit a downlink positioning reference signal (DL PRS) and in uplink the UE transmits SRS. Based on these signals the UE Rx-Tx time difference and gNB Rx-Tx time difference measurements are made and then reported to the location server which resides in the core network. The reporting and measurement configurations are done using higher layer signaling involving the core network. The Rx-Tx measurements measure the absolute time between receiving and transmitting two reference signals (i.e., DL PRS reception and SRS transmission for UE Rx-Tx).

RTT/2 is an alternative approach to TA/2 to estimate PD, and both has its pros and cons. Using TA for PD estimation updates implies that the gNB has the frame timing reference, as the gNB otherwise cannot calculate TO and issue a TAC based on an UL transmission. This also means that using TA for other cells is not a suitable source for PD estimation. RTT/2 on the other hand, has no such requirement and is not bounded by the specifications and RAN4 requirements related to TA. As both an UL and DL reference signal are specified, it also means that the procedure does not require the gNB to have the perfect timing estimation and therefore works for non-serving cells. Another benefit is that RTT/2 is not bounded by the TA performance requirements (e.g. TA adjustment precision) or TAC signaling granularities, and the reference signals can be allocated such that the UE spends a minimum time active which is beneficial from a power saving point of view.

Using TA for PD compensation has at least four problems that are solved by and with the examples described/disclosed herein. A summary of the problems and corresponding disclosed herein solutions is presented in Table 1.

TABLE 1

Problem and solution mapping

| | Problem | Solution presented by the examples described herein |
|---|---|---|
| A. | The UE cannot trigger a PD estimation update without uplink data. | The UE is provided a new signaling to indicate to the NW that it needs a PD update. |

TABLE 1-continued

Problem and solution mapping

| | Problem | Solution presented by the examples described herein |
|---|---|---|
| B. | Timing advance introduces additional error sources (about +150 ns), that is the cost of compensating the PD. | The mechanism disclosed herein is designed to be highly accurate (gNB managed) by reusing a principle from positioning but streamlined for a single gNB. |
| C. | The applied TA is not always available at the NW, if this needs to execute propagation delay compensation. The UE knows the applied TA. | The mechanism disclosed herein includes options for either the UE or NW to conduct PD compensation. |
| D. | UE has to transition to RRC_CONNECTED to obtain a new PD estimation. No indication possible in RRC_INACTIVE. | The procedure disclosed herein allows the operation without requiring the UE to transit to RRC_CONNECTED state first. |

Regarding problem A, the current TA procedure applies to PUCCH, PUSCH and SRS transmissions (aperiodic and periodic). The measurement (timing offset (TO)) for a UE in RRC_CONNECTED, is done based on these signals and adjusted if needed with a timing advance command (TAC). If the UE is not configured with P-SRS, or has UL or DL data, none of these signals are available and hence no TAC is possible. At the same time, it is only the UE, which can track the relative change in DL timing, to estimate the need for a TA update.

Analysis conducted in RAN1 in 2019 [R1-1900935], has demonstrated that timing advance used for PD compensation can achieve approximately 340 ns accuracy in an indoor factory deployment. In contrast, when TA is not used for PD compensation in a comparable scenario, the accuracy is between 215 ns and 415 ns depending on the maximum considered distance to the gNB. It is apparent that PD compensation is beneficial when the PD between the gNB and UE is larger than a certain threshold, but below this threshold, it might actually carry an additional error. Part of this additional error originates from the specification related to timing advance, the signaling granularity for timing advance commands (TE_TA-G which introduces +−130 ns) and requirements to apply timing advance (TA-err which introduce +−130 ns).

Regarding problem C, it was discussed during Release-16, which entity should apply PD compensation. With timing advance as a basis for PD compensation, when the NW is responsible for PD compensation, it relies on its estimation of the TA applied by the UE. The UE has features to adjust TA autonomously, if needed, and the gNB has no signaling to request the UE what TA it is applying.

Problem D is due to the fact that the TA procedure only works for UEs in RRC_CONNECTED. The UE can receive SIB9 in RRC_INACTIVE or RRC_IDLE, but to update the PD with TA, the UE would need to transition to RRC_CONNECTED, a signaling heavy procedure, just to acquire a new TAC and then transition back to RRC_INACTIVE or RRC_IDLE.

To address these issues, two general directions can be chosen (or a combination). Either the TA procedure is enhanced, or a new set of mechanisms designed for PD measurement and compensation is introduced. A typical argument for the latter option, is that TA is designed to keep the UL transmission reception time within the CP (scaling linearly with SCS) whereas the target with the time synchronization accuracy is in the order of hundreds of nanoseconds and that it therefore is an over-the-top solution to enhance the timing advance procedure for the purpose of accurate time synchronization.

The baseline mechanism in Release-16 uses timing advance for PD estimation and assumes the UE may conduct PD compensation. None of issues A, B, C and D are addressed with the baseline Release-16 mechanism.

An Enhanced-CellID positioning method (E-CID) with RTT measurement is specified in LTE. In this method, the use of TA is applied to acquire an RTT measurement, which is used to estimate the UE position. As this is based on TA it has the same issues as addressed herein occurring from TA. Therefore, E-CID does not address the identified issues (A, B, C or D).

The 5G NR Release-16 Multi-RTT procedure (RP-190752) is a procedure to acquire a high accuracy positioning estimation utilizing multiple cells, and is applied to cells where the UE is poorly synchronized. It does, however, not apply directly to time synchronization, and measurements are not available to both the UE and gNB, but are rather encapsulated in higher layer signaling between the gNB/UE and the LMF. This also means that this procedure does not solve the identified issues addressed by the methods described herein, or merely addresses some in a signaling heavy manner. More specifically, issue A can addressed with a SIP, where the UE (which can host a LMF client (location client)) triggers a positioning update. From the point of synchronization, a reference signal triggered by the LMF can be used to update the timing offset measurement, and hence trigger a TA update for a PD update. However, this is a very signaling heavy solution. Issue C and D is not addressed as measurement cannot be provided to the UE, and the UE is not aware of the NW calculation. Issue B is addressed, but the examples herein dramatically improves the signaling procedure as the signaling and triggers focus between the UE and its serving gNB. The 5G NR Release-16 Multi-RTT procedure involves multiple TRP/gNBs, which is not necessary for time synchronization—enhancements exploiting this are considered by the examples described herein. In the case of the UE to serving gNB, there are still benefits of the RTT based procedure compared to TA, as described herein.

Another procedure includes where the gNB configures SRS and DL-PRS/DL-DMRS. In this procedure, the gNB could configure the UE with periodic SRS and periodic PRS wideband signals to attempt to ensure high accuracy time synchronization. This can be considered as a workaround for issue A, B and C and works if the periodicity is sufficiently high, such that the PD is updated sufficiently frequently. It is however, also a resource expensive method, as it would have to be overly conservative in selecting a sufficiently low periodicity. On the other hand, if is it not sufficiently conservative, the UE still has no means to indicate if the PD changes too fast (issue A). So this solution is not considered an adequate solution.

Thus, the examples described herein introduce a PD compensation framework which allows the NW to dynamically select the PD estimation technique and allows the NW to dynamically adjust configuration parameters to fit the accuracy provided to the UE. The framework supports the RTT based PD estimation technique known from positioning, but here tailored for time synchronization and not positioning as the procedure is altered to single cell, and with a new, low signaling overhead, activation mechanism and with a semi-static relation between UL and DL reference signals (which combination can be selected dynamically by the NW). The mechanism supports that a capable UE can notify the gNB when it needs a PD estimation update. As the UE can end up having PD estimates from both RTT and TA, a selection/prioritization mechanism is included in the framework.

Using this PD estimation framework, expansions to the method can be considered, including a NW based accuracy estimation to determine the required reference signal configurations, and estimation techniques on the benefits of reference signals bursts and multi-cell based time synchronization.

Figure 2:
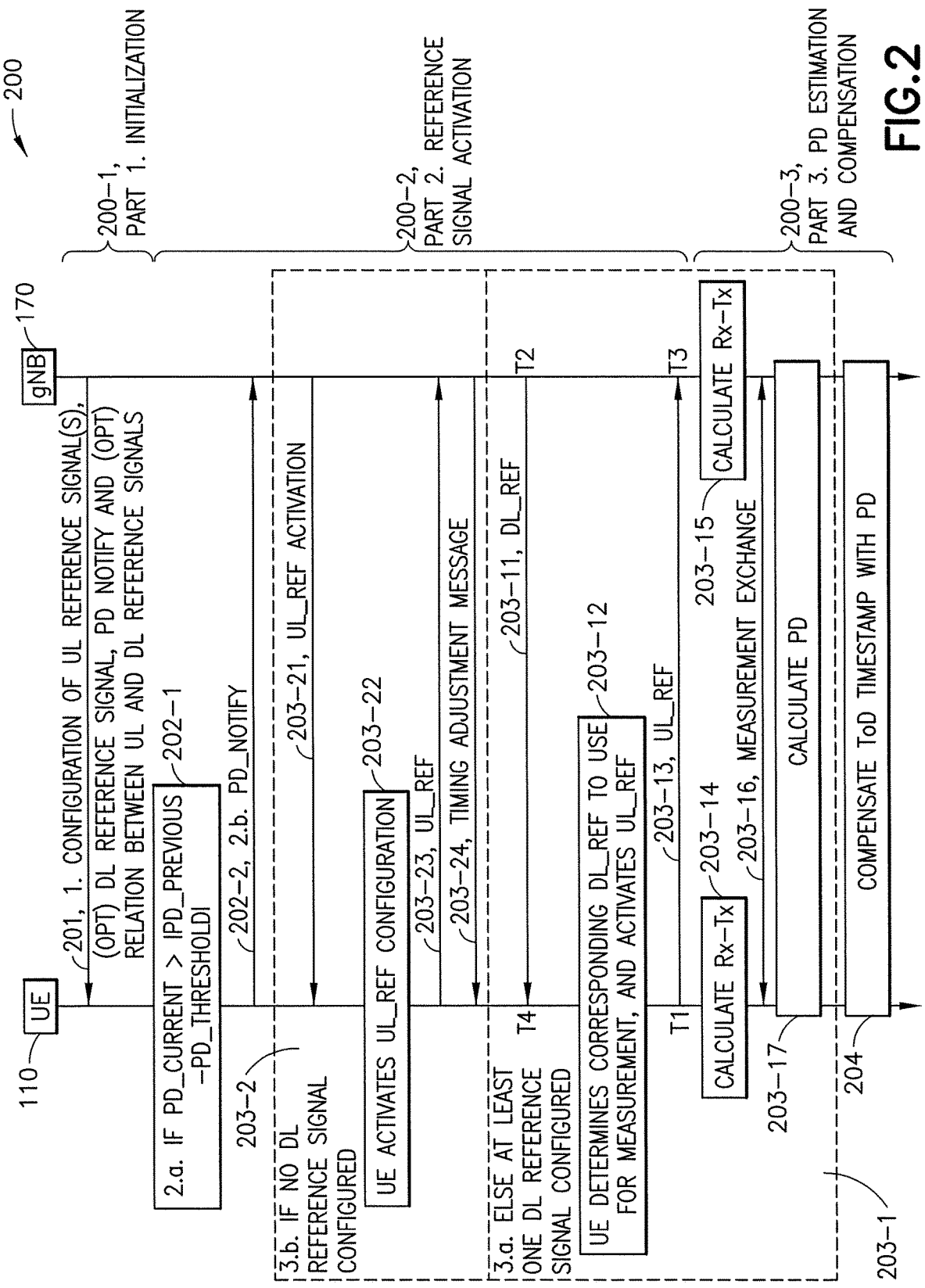
FIG. 2 is a high-level flow chart of a UE initiated propagation delay estimation mechanism.

A high-level flow chart of the method is provided in FIG. 2. The described method comprises three main parts: Part 1. initialization 200-1 (per serving cell), Part 2. reference signal activation 200-2 (per serving cell), and Part 3. PD estimation and compensation 200-3. These three main parts are described as follows.

In the initialization 200-1 the NW decides if the PD estimation framework should be configured to support the RTT based PD estimation technique or reside on TA for the target UE. This decision can be made based on the required time synchronization accuracy (assuming that TA and the RTT is designed for separate accuracies and the TA procedure is not optimized for time synchronization) and the UE capabilities. The initialization may be per serving cell.

The gNB 170 configures (at 201, or item 1 in FIG. 2) the UE 110 to provide PD_notify (at 202-2, item 2.b) which is a part of the UCI framework, such that it can indicate to the gNB 170 that it believes a PD estimation update is needed. In other embodiments the PD_notify configuration 201 is provided as (SR (reserved LCH), special CG, new MAC CE, new RRC message, new NAS message, or added to MSG2/4 in RACH). In another embodiment the PD_notify message is expanded to also provide burst requests and desired periodicity. In an alternative embodiment, the gNB 170 is triggering the PD estimation update (PD_notify is not used) e.g. based on mobility events or a timer expiry.

If the UE 110 is configured for PD_notify, the gNB 170 at 201 provides the UE 110 with a PD_threshold which the UE 110 uses to determine the need for a PD_notify request 202-2 (item 2.b). This is a fixed value provided by the gNB 170 (it can be fixed, but it can also be semi-static; but it is determined by the gNB). In another the embodiment PD_threshold is determined by the gNB 170 based on the accuracy budget and UE mobility event statistics.

If the RTT based method is supported, the gNB 170 at 201 configures both UL SRS and DL PRS reference signals as well as an index between the configurations which allows the gNB 170 to dynamically select between configuration combinations. The index between the configurations provides novelty as with this configured relation, the gNB can manage which configurations are used together, and it can manage if a TA or RTT based method is used.

The UE 110 is configured to conduct PD compensation on the ToD timestamp with the acquired PD estimate. In an alternative embodiment the NW can also be configured to do the PD compensation on the ToD timestamp with the acquired PD estimate.

During initialization, the configuration 201 of UL and optionally DL reference signals leverages the specifications for A-SRS, P-SRS and DL-PRS. However, in order to refer to a specific DL reference signal (could also be an SSB) the examples described herein introduce a DL RS index, such that multiple options of DL RS can be referred to through the method (refer e.g. to 203-12). Examples of UL_Ref tables and DL_Ref tables are found in Table 2 and 3 respectively.

TABLE 2

Example of UL_Ref configurations and indexes

| UL_Ref configuration index | Configuration |
|---|---|
| 0 | A-SRS 0 |
| 1 | A-SRS 1 |
| 2 | P-SRS 0 |

TABLE 3

Example of DL_Ref configurations and indexes

| DL_Ref configuration index | Configuration |
|---|---|
| 0 | DL-PRS ID 0 |
| 1 | DM-RS (preamble index 1) |
| 2 | SSB index 3 |

The examples herein provide for configuration of a novel propagation delay notification signal (e.g. PD_notify 202-2 and/or PD_notify configuration at 201). Below is a non-exhaustive list of options to implement PD_notify (enumerated as A-H).

A) An additional HARQ-ACK bit. By reserving a specific bit index in the HARQ-ACK codebook, PD_notify (201 and/or 202-2) can be carried within a HARQ-ACK codebook or either high or low priority (e.g. priorities introduced in R16). In this option, it would be rather expensive in terms of codebook size to reserve this entry for every codebook. A periodicity or "every second" alike mechanism could be used to reduce the overhead.

B) Scheduling request (by reserved LCH). Scheduling requests are used to indicate that a particular logical channel has data in its buffer. By reserving a logical channel for PD_notify (201 and/or 202-2), the existing framework for SR can be used for PD_notify. This option could also be used for more than one bit of the PD_notify payload.

C) New UCI type. Alike CSI reporting in the UCI framework, a set of PUCCH-Resources could be configured for the purpose of PD_notify 202-2. This option would enable more than one bit for PD_notify.

D) Special Configured-Grant (CG). CG provides a framework for the UE to deliver user plane data from preconfigured LCH, in pre-configured resources, meaning it does not have to use the SR framework and wait for a dynamical grant. One of these could be used to deliver PD_notify (201 and/or 202-2), for example by reserving a LCH or by dedicating this CG to C-plane messages (e.g. of a MAC CE). This option can also be used for UEs in RRC_IDLE or RRC_INACTIVE, as CG can be used from RRC_INACTIVE from Release-17.

E) A new MAC Control Element (CE) type. MAC CEs are used by the gNB and UE to deliver and request essential information related to the MAC layer. This can be for example a buffer status report, or a power headroom report. A new type could therefore be defined which carries PD_notify (201 and/or 202-2). This method is also a good option for more than 1 bit PD_notify.

F) A new RRC message. Defining a new RRC message is another option. While being a slightly slower option, it is simpler to expand in the future and can carry a larger payload.

G) A new NAS message is another option.

H) Adding a new field in message 2 (for two-step RACH) or message 4 in (four-step RACH). This option is particularly beneficial for the mechanism to work from RRC_INACTIVE or RRC_IDLE.

The PD_threshold may be used to trigger the PD_notify (201 and/or 202-2). There is a range of parameters the NW can use to configure PD_threshold. In one example the PD_threshold is preconfigured upon installation. The NW may also be aware of the time synchronization requirement (from CN) and creates a budget of time inaccuracies for the involved components. Eventually the NW can roughly estimate the needed margin and then reaction time for PD_threshold. It should be noted that this budget also needs to account for the UE mobility history (e.g., a fast moving UE can have a smaller threshold to trigger more frequent updates of PD estimation) and the deployment scenario (e.g. wide-area or smaller indoor deployment).

Configuration for reporting of Rx-Tx measurement (i.e., UE Rx-Tx time difference if DL RS are included) may be included as part of PD_notify. For the UE to report UE Rx-Tx this may be through the UCI framework (like CSI), or a special CG or a new RRC message. If no special resources are configured, the gNB may request the measurement with e.g. a new MAC CE. For the gNB to report gNB Rx-Tx this may be using either a new MAC CE, a special SPS configuration, or a new RRC message.

Figure 3:
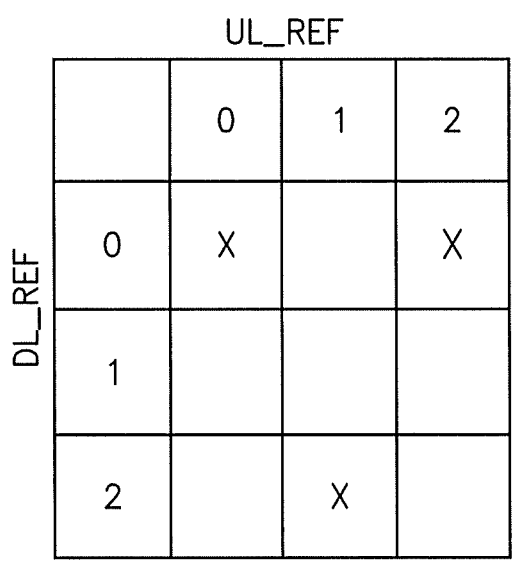

The examples described herein provide for configuration of the relation between UL and DL reference signals. In particular, with a set of UL reference signals and DL reference signals configured, a relation between them (UL_Ref signals and DL_Ref signals) is also configured. This can be achieved by a mapping matrix, indicating which DL_Ref index can be used, when a specifically UL_Ref is configured. An example is provided in FIG. 3. If a single UL_Ref can be mapped to multiple DL_Ref, the latest received is used as the reference for the Rx-Tx measurement. In the example mapping matrix of FIG. 3, UL_Ref 0 is mapped/related to DL_Ref 0, UL_Ref 1 is mapped/related to DL_Ref 2, and UL_Ref 2 is mapped/related to DL_Ref 0.

The new procedure of PD estimation is activated 200-2 by the UE 110 by comparing at 202-1 (item 2.a) the instantaneous PD estimation (estimated by the UE 110 as PD_current) with the previous NW provided PD value (PD_previous) and the change threshold PD_threshold. Particularly, the UE 110 determines whether PD_current>|PD_previous−PD_threshold|. In an alternative implementation, this step is skipped and the procedure is triggered by the gNB 170 (e.g. by activating an UL reference signal configuration with a DL reference signal relation). The reference signal activation may be per serving cell.

Upon triggering of the procedure, the UE 110 transmits SRS in response to a DL reference signal. The UE 110 determines the intended gNB 170 response, by detecting the PD estimation method by checking if it has a relation configured between UL and DL reference signals associated to a received DL reference signal. If the UE 110 is configured with a configured relation between UL and DL reference signals, it autonomously initiates an Rx-Tx measurement on the signals with a preconfigured relation. If there is no relation, the UE expects traditional timing advance.

The mechanism trigger is based on the UE monitoring for DL PD change and PD_notify 202-2 is signaled if the UE 110 detects that PD_current>|PD_previous−PD_threshold| (refer to 202-1).

Upon receiving PD_notify 202-2 the gNB 170 conducts the following steps 1-2: 1) Determine which UL_Ref should be activated. This could for example be based on an estimation of the needed accuracy (e.g. from an additional payload in PD_notify 202-2). 2) Send (at 203-21) the activation signal for UL_Ref. This can be done in several ways, including existing DCI formats, which are currently used to activate A-SRS, an existing RRC framework to configure P-SRS, a new or extended DCI format/field designed to carry a UL_Ref indication (for example, a SRS resource indicator could be extended for the purpose to cover e.g. 8 or 16 UL_Ref indexes), or a new RRC message.

In an alternative embodiment 203-1, the gNB 170 initiates the procedure, e.g. by activating the SRS configuration which has a corresponding DL reference configured. This is beneficial if the gNB 170 estimates that the need for a PD update is urgent (e.g. prior to a mobility event).

The UE 110 then conducts the following actions if it is configured with at least one DL_Ref: look up in the table which DL_Ref indexes are related to the UL_Ref indexes; if there are more than one DL_Ref, the UE chooses (at 203-12) the first (e.g. by time order) of which it was configured; the UE at 203-14 measures the time between receiving the DL_Ref at time T4 to the transmission time of its UL_Ref at time T1.

When the Rx-Tx measurement is obtained, the counterpart needs to be provided (at 203-16) to the entity responsible for PD-compensation. If the gNB 170 is responsible for PD compensation, the Rx-Tx measurement 203-14 is delivered from the UE 110 to the gNB 170. The implementation options for this are: a new MAC CE, which is a similar concept as also described for PD_notify in Part 1. Here the gNB 170 can request the measurement; a special CG, reserved for Rx-Tx measurements (and possibly also PD_notify); a new UCI report; a new RRC message; or a new NAS message.

Similar options can be considered when the UE 110 is configured to conduct PD compensation, as it needs to receive the Rx-Tx measurement 203-15 from the gNB 170, except for the CG.

Regarding PD estimation and compensation, if at least one DL reference signal is configured (refer to 203-1—item 3.a), the UE 110 and gNB 170 conduct an Rx-Tx measurement (respectively 203-14 and 203-15). If the UE 110 is configured to conduct PD compensation, then the gNB 170 at 203-16 signals the UE 110 with the gNB 170 Rx-Tx measurement 203-15. This can be with a new MAC CE or RRC message. If the gNB 170 (or NW) is configured to conduct PD compensation, then the UE 110 at 203-16 signals the gNB 170 with its Rx-Tx measurement 203-14. This can either be as a MAC CE or RRC message. The gNB 170 may also request this measurement 203-14. Further details are provided herein on the method differences if the gNB 170 or UE 110 is configured to conduct PD estimation. The PD is estimated as e.g. RTT/2=((T3−T2)+(T4−T1))/2 (from FIG. 2, i.e. T1, T2, T3, and T4 are shown in FIG. 2). The UE 110 selects between the PD estimate (if multiple ones are available) as further described herein.

If no DL reference signal is configured (refer to 203-2—item 3.b), the UE 110 expects a timing adjustment message at 203-24 from the gNB 170 (if needed). This adjustment message 203-24 can be a TAC, or it can be a new message (MAC or RRC). The PD is estimated as the accumulated timing adjustments. A new ToD is compensated by the latest PD measurement.

Accordingly, a signaling diagram 200 is shown in FIG. 2, comprising part 1 (initialization 200-1), part 2 (reference signal activation 200-2), and part 3 (PD estimation and compensation 200-3).

At 201 the gNB 170 provides the UE 110 a configuration of UL reference signal(s), optionally a DL reference signal, a PD_notify, and optionally a relation between UL and DL reference signals. At 202-1, the UE 110 determines whether PD_current is greater than the absolute value of PD_previous minus PD_threshold. At 202-2, the UE 110 transmits PD_notify to the gNB 170 in response to a positive determination at 202-1.

During 203-2 (when no DL reference signal is configured), at 203-21 the gNB 170 transmits an UL_Ref activation signal to the UE 110. At 203-22, the UE 110 activates the UL_Ref configuration. At 203-23, the UE 110 transmits a UL_Ref 203-23 signal to the gNB 170. At 203-24, the gNB 170 transmits a timing adjustment message to the UE 110.

During 203-1 (when at least one DL reference signal is configured), the gNB 170 at time T2 transmits DL_Ref (reference number 203-11) to the UE 110, which is received by the UE at time T4. At 203-12, the UE 110 determines the corresponding DL_Ref to use for measurement, and activates UL_Ref. At time T1 to the UE 110 transmits UL_Ref (reference number 203-13) to the gNB 170, which is received by the gNB at time T3. At 203-14, the UE 110 calculates Rx-Tx, at 203-15 the gNB calculates Rx-Tx. At 203-16 the UE 110 and gNB 170 perform a measurement exchange, namely the UE 110 transmits the calculated Rx-Tx at 203-14 to the gNB 170, and/or the gNB 170 transmits the calculated Rx-Tx at 203-15 to the UE 110. At 203-17, the PD is calculated by the UE 110 and/or gNB 170. At 204, the UE 110 and/or gNB 170 compensate the ToD timestamp with PD.

Figure 4:
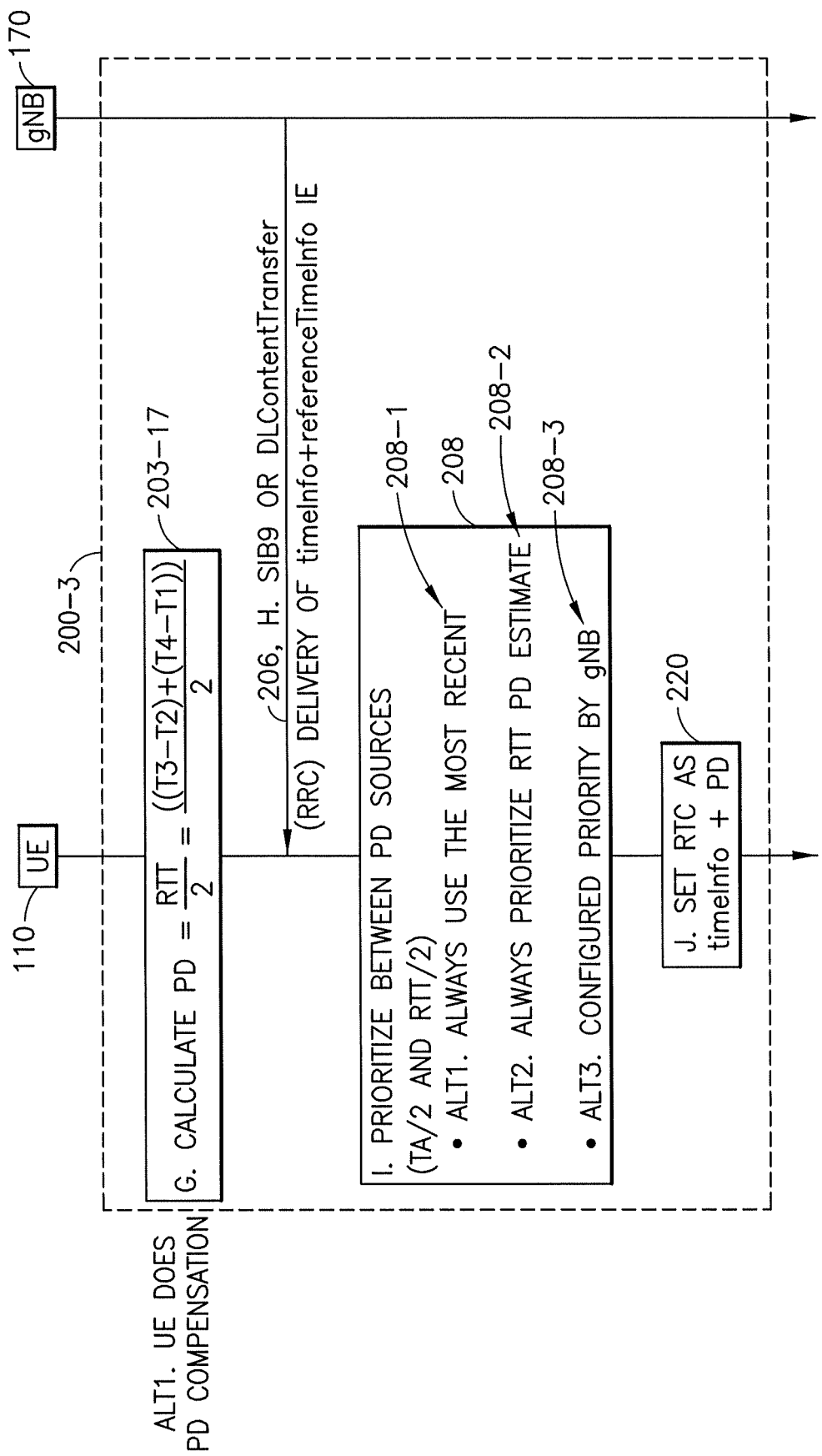
FIG. 4 is a flow chart of PD compensation on the UE.
Figure 5:
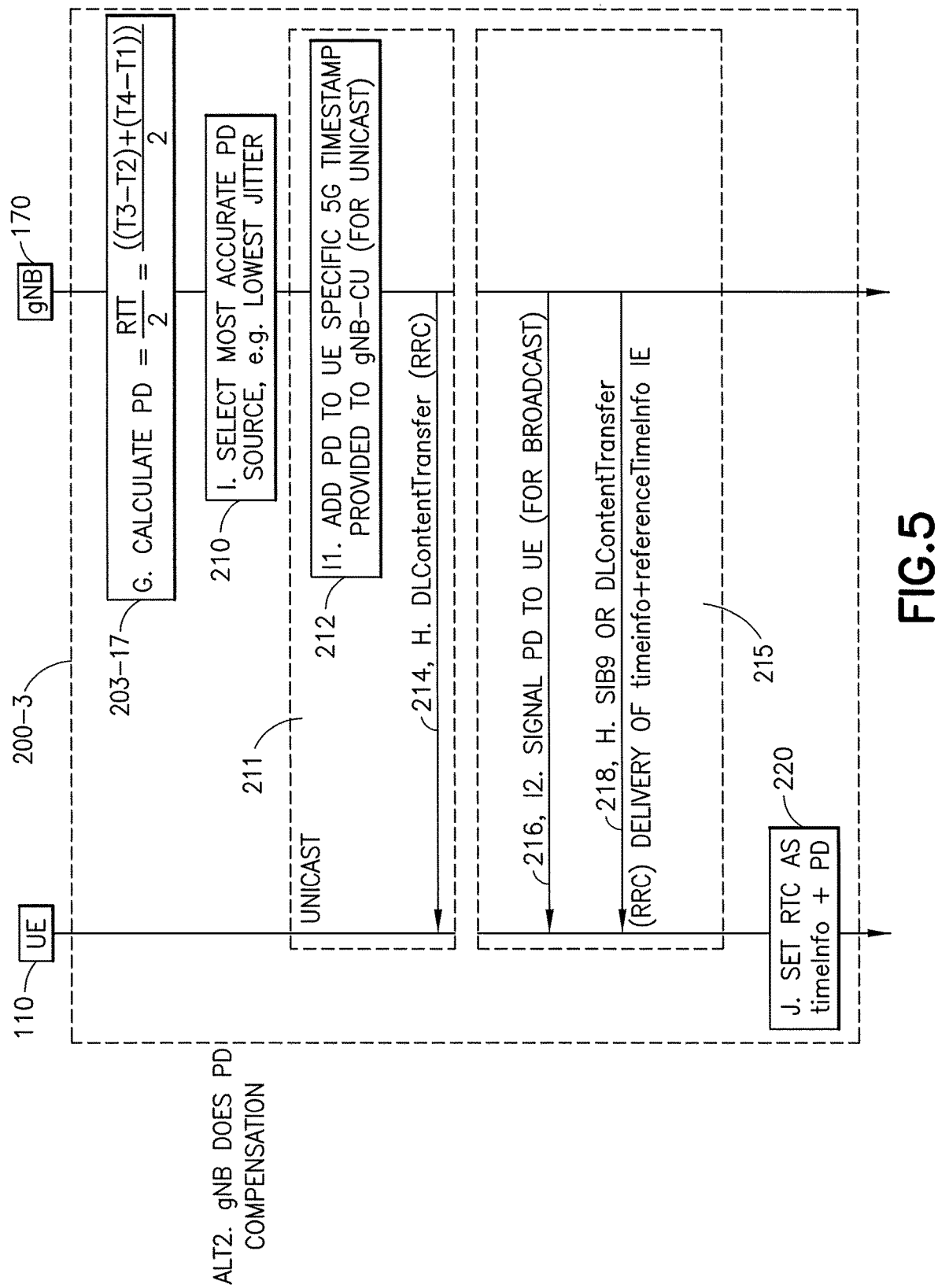
FIG. 5 is a flow chart of PD compensation on the RAN node (e.g. the gNB).

A flow chart for the case where the UE 110 is conducting PD compensation 200-3 and where the gNB 170 is conducting PD compensation 200-3 is provided in FIG. 4 and FIG. 5 respectively. These are for the case where the Rx-Tx measurement is available (at least one DL_Ref is configured—refer to 203-1 of FIG. 2).

In both cases FIG. 4 and FIG. 5, the PD is first calculated (item 203-17—item G). Then if the UE 110 is conducting PD compensation, at 206 (item H in FIG. 4) it waits for a reception of SIB5 which can be delivered in broadcast mode or in unicast mode (through DLContentTransfer or RRCReconfiguration in Release-16). At 208 (item I of FIG. 4), the UE 110 then has possibly two sources for PD estimation: the Rx-Tx measurement (if available), e.g. RTT/2, and the TA procedure, e.g. TA/2, and has to either combine these, or use one of them. This choice can be either preconfigured or left for UE implementation. The options are provided as A-D below:

A) The UE 110 uses the most recent of the possible sources (at 208, Alt 1. using the most recent). This is a simple configuration, but may not be optimal and accurate because a measurement can be impacted by fading, but also simply if the latest measurement is an outcome of another configuration e.g. with a reference signal of a smaller bandwidth, and as a result likely to be less accurate.

B) The UE 110 uses either RTT or TA. This is another simple configuration option, which however may make more sense as the gNB can estimate the accuracy of one based on the other.

C) The UE 110 uses the one with highest estimated accuracy. The accuracy can be estimated by time tracking algorithms and the used bandwidth for the reference signals along with the granularity of the measurement.

D) The UE 110 combines the two sources. If the UE 110 uses time tracking algorithms, it can switch between the two or combine the two sets of measurements from the basic idea that they attempt to measure the same. It might be that one needs to be weighted different than the other, for example based on its expected accuracy.

Thus, and as further shown in FIG. 4, namely the alternative when the UE does PD compensation 200-3, at 203-17 the UE 110 calculates PD as RTT/2=((T3−T2)+(T4−T1))/2. At 206, the gNB 170 transmits SIB9 or delivers DLContentTransfer (RRC) of the timeInfo+referenceTimeInfo IE. At 208, the UE prioritizes between PD sources TA/2 and RTT/2. The alternatives shown at 208 are Alt 1 (use the most recent) 208-1, Alt 2 (prioritize RTT PD estimate) 208-2, and Alt 3 (use a gNB configured priority) 208-3. At 220 (item J of FIG. 4), the UE 110 sets RTC as timeInfo+PD.

When the gNB 170 conducts PD compensation 200-3, it potentially also has two sources for PD estimation. But with the uncertainties as explained previously, it should be clear that if an Rx-Tx measurement is available this is used as the PD reference on the gNB 170 (see item 210—item I of FIG. 5). The gNB 170 at 211 then needs to generate a UE specific SIB9 message 212—item I1 of FIG. 5 (or to a group of UEs with sufficiently similar PD).

In an alternative implementation 215, the gNB 170 at 216 (item I2 of FIG. 5) signals the PD to the UE 110 (a new signal), which enables the gNB 170 to distribute SIB9 using broadcast mode 218 (item H of 215 of FIG. 5).

Thus, and as further shown in FIG. 5, namely the alternative when the gNB 170 does PD compensation 200-3, at 203-17 the gNB 170 calculates PD=RTT/2=((T3−T2)+(T4−T1))/2. At 210, the gNB 170 selects the most accurate PD source, e.g. the PD source with the lowest jitter. For unicast at 211, the gNB 170 at 212 adds the PD to a UE specific 5G timestamp provided to the gNB-CU 196 (for unicast), and provides at 214 (item H of 211 of FIG. 5) a DLContentTransfer (RRC) signal to the UE 110. At 215, the gNB 170 at 216 signals the PD to the UE 110 (for broadcast), and at 218 the gNB 170 signals SIB9 or DLContentTransfer (RRC) delivery of timeInfo+referenceTimeInfo IE. At 220 (item J of FIG. 5), the UE 110 sets RTC as timeInfo+PD.

In summary, the examples described herein introduce a PD_notify signal (including 202-2), a Rx-Tx measurement report 203-16 from gNB to UE, and/or from UE to gNB outside of positioning protocols, configuration of the relation between DL and UL reference signals 201, UL and DL reference signal indexes used to activate the configuration signals, a mixing of various configurations (as further described herein), and selection mechanisms of the PD estimation mechanism.

The examples herein further provide implementation of a UE mechanism (collectively 201, 203-1 and 203-2) to determine the relation between UL and DL reference signals, UE measurement filtering (e.g. 202-1) for the trigger of PD_notify 202-2, NW system optimization for relations between UL and DL reference signals—e.g. based on desired accuracy, a NW algorithm to determine the optimum PD_threshold, e.g. based on accuracy budget and UE mobility characteristics, and UE 110 expansions to PD_notify 202-2—e.g. desired periodicity, measurement bursts, or current accuracy for gNB 170 corresponding action (refer to the embodiments as further described herein).

The examples herein provide many advantages, benefits, and technical effects. These include providing a method to solve problems A, B, C and D. These also include avoiding core network signaling needed for Rx-Tx measurements (e.g., over LPP or NRPPa). In addition, the examples described herein allow the NW to more accurately select the resources for reference signals for synchronization, based on the UE feedback. Without it, the NW has to be conservative (e.g. by selecting a too frequent and too high bandwidth) in the hope that the synchronization accuracy is satisfied. Furthermore, the examples described herein are flexible enough to also be used in a multi-cell scenario, exploiting PD estimation and compensation for multiple cells.

Additional embodiments may be considered as an adaptation to specific scenarios, namely additional embodiments 1-4.

Additional embodiment 1 involves serving UEs in RRC-IDLE or RRC-INACTIVE. The examples described herein can be configured to also function for UEs in RRC-IDLE or RRC-INACTIVE. The PD_notify signal can be configured through a special CG configuration or as a part of the RACH procedure. The delivery of the measurement, then needs to be configured, either through a special CG (for UL) or a short-data transmission e.g. in two-step RACH. As part of this embodiment the UE may be configured with DL PRS from multiple cells which the UE measures periodically while in RRC-IDLE or RRC-INACTIVE to calculate the RSTD. Monitoring these RSTD measurements can be used as an alternative trigger for when PD_notify is sent (i.e., if RSTD changes by more than a threshold then PD_notify is sent).

The steps involved in additional embodiment 1 are: using the option of relating UL and DL RS linking is important for a UE not being connected (i.e. cannot be assumed to be listening for DL); (optional) aligning the DL reference with SIB9 to minimize the UE awake time; (optional) use a high accuracy DL reference along with the UL reference to mitigate the need for multiple measurements; using PD_notify in RACH or CG is preferred here. The CG has the benefits of also being able to carry Rx-Tx measurement if the NW is responsible for PD estimation; the UE may be configured with DL PRS from multiple cells which the UE measures periodically while in RRC-IDLE or RRC-INACTIVE to calculate the RSTD. Monitoring these RSTD measurements can be used as an alternative or additional trigger for PD_notify.

Additional embodiment 2 involves expansions to PD_notify (more than 1 bit). PD_notify can be configured with different formats. The simplest one is a single bit signal. Possible extensions are A-B:

A) The UE signals its expected accuracy or current accuracy, or quantizes the expected accuracy or current accuracy to an urgency indicator. This can be used by the gNB to choose corresponding DL_Ref and UL_Ref to achieve the desired accuracy. It can also be used to determine if new reference signals (RSs) should be configured and how often they should occur. This can be either an explicit report on the accuracy or an implicit metric used to estimate the accuracy, such as the current timing advance or PD_current, of which the gNB can compare with the expected accuracy.

B) A configuration format for PD_notify may include expected periodicity for updates, or a request of a number of measurements to enhance stability (a burst of measurements). With this the NW can then configure bursts of BW of the reference signals accordingly. This is particularly relevant when the UE has woken up from RRC_IDLE or the UE has just entered a new cell. In these cases, it could mean that the UE has a less accurate DL timing reference and the gNB has no or only a few TO measurements. In these cases it can be beneficial to have multiple measurements in a short duration of time to aid convergence of the filters. This embodiment can be realized by simply using the existing framework, but the gNB activates UL_Ref multiple times. It could also be realized by the gNB embedding a "reoccurrence" indicator in the UL_Ref signal.

The benefit of these options is that they all enhance the gNB options to assist the UE in ensuring the accuracy requirement is met, without unnecessary resource and power usage.

Additional embodiment 3 involves multi-RTT for further enhanced timing accuracy from multiple neighboring cells. The described method is easily expanded towards neighboring cells, where the use of linked DL and UL reference signals are essential as the UE might not be accurately synchronized towards the neighboring cells. In this case it should be the UE conducting PD compensation. This embodiment can provide diversity to the PD compensation (if one measurement is poor e.g. due to NLOS), ensure faster convergence of filters, or improve accuracy by exploiting that SIB9 might be separately encoded such that rounding errors can be averaged out.

It is assumed that the methods described herein can be applied per serving cell. Activation of UL_Ref can be done from the master to another serving cell. The PD_notify signal can be kept towards the master gNB. The trigger can be also for other cells, and in this case, a cell ID is added to PD_notify. Rx-Tx measurements can be through the master gNB, such that the measurement message is expanded to capture measurements from multiple cells.

In an alternative implementation, the RTT measurements are collected by the LMF (e.g. of the gNB 170), but delivered to the UE 110. ToD is transmitted from multiple neighboring cells. The UE estimates refSFN for each neighbor cell. PD estimation is acquired from each neighbor cell. ToD is compensated with each PD estimation. As in additional embodiment 1, the UE may be configured with DL PRS from multiple cells which the UE measures periodically to calculate the RSTD. Monitoring these RSTD measurements can be used as another trigger for PD_notify.

Additional embodiment 4 involves UE automatic disabling of reference signals, when it does not receive SIB9 anymore. For the case where periodic reference signals are being used, the gNB would have to disable each configuration when the UE is no longer in need for SIB9. Signaling can be saved if the UE disables the configuration automatically when no longer receiving SIB9.

Figure 6:
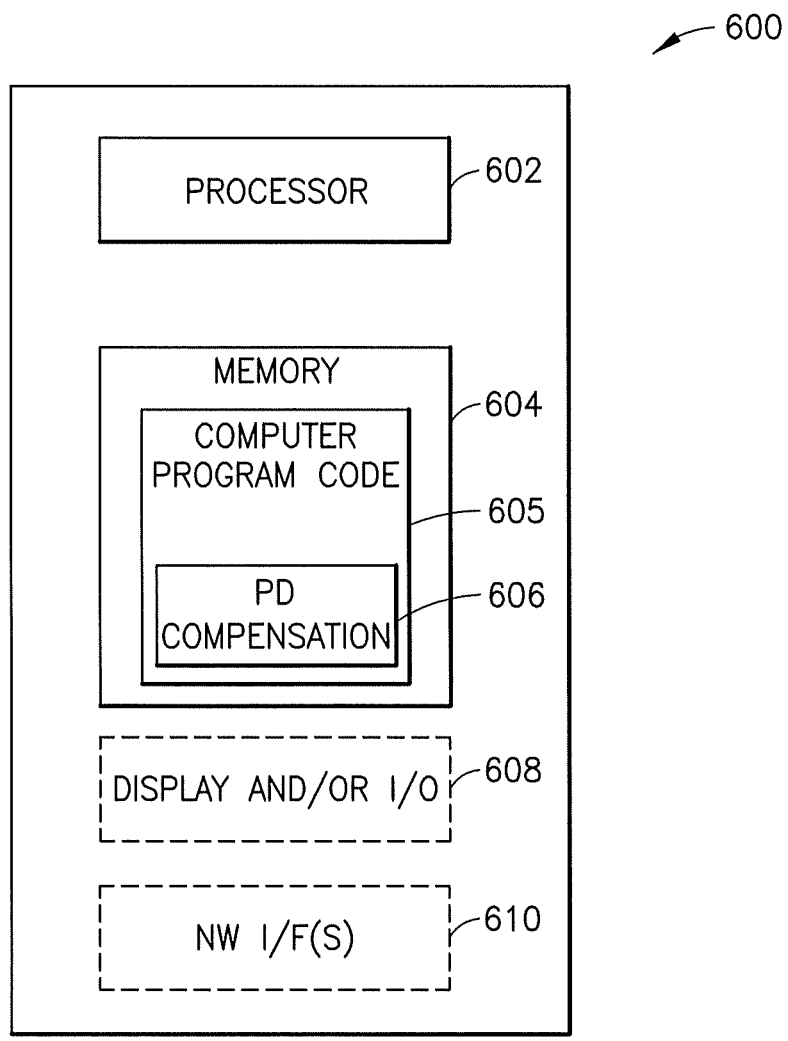
FIG. 6 is an example apparatus configured to implement a propagation delay compensation mechanism, based on the examples described herein.

FIG. 6 is an example apparatus 600, which may be implemented in hardware, configured to implement propagation delay compensation, based on the examples described herein. The apparatus 600 comprises a processor 602, at least one non-transitory memory 604 including computer program code 605, wherein the at least one memory 604 and the computer program code 605 are configured to, with the at least one processor 602, cause the apparatus to implement circuitry, a process, component, module, or function (collectively 606) to implement propagation delay (PD) compensation. The apparatus 600 optionally includes a display and/or I/O interface 608 that may be used to display aspects or a status of the method described herein (e.g., as the method is being performed or at a subsequent time). The apparatus 600 includes one or more network (NW) interfaces (I/F(s)) 610. The NW I/F(s) 610 may be wired and/or wireless and communicate over the Internet/other network(s) via any communication technique. The NW I/F(s) 610 may comprise one or more transmitters and one or more receivers.

The apparatus 600 may be UE 110, RAN node 170, or Network Element(s) 190. Thus, processor 602 may correspond to processor(s) 120, processor(s) 152, or processor(s) 175, memory 604 may correspond to memory(ies) 125, memory(ies) 155, or memory(ies) 171, computer program code 605 may correspond to computer program code 123, module 140-1, module 140-2, computer program code 153, module 150-1, module 150-2, or computer program code 173, and NW I/F(s) 610 may correspond to N/W I/F(s) 161 or N/W I/F(s) 180. Alternatively, apparatus 600 may not correspond to either of UE 110, RAN node 170, or Network element(s) 190 (for example, apparatus 600 may be a remote, virtual or cloud apparatus).

References to a 'computer', 'processor', etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

The memory 604 may be implemented using any suitable data storage technology, such as semiconductor based memory devices, flash memory, magnetic memory devices and systems, optical memory devices and systems, fixed memory and removable memory. The memory 604 may comprise a database for storing data.

As used in this application, the term 'circuitry' refers to all of the following: (a) hardware-only circuit implementations, such as implementations in only analog and/or digital circuitry, and (b) combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present. This definition of 'circuitry' applies to all uses of this term in this application. As a further example, as used in this application, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device.

Figure 7:
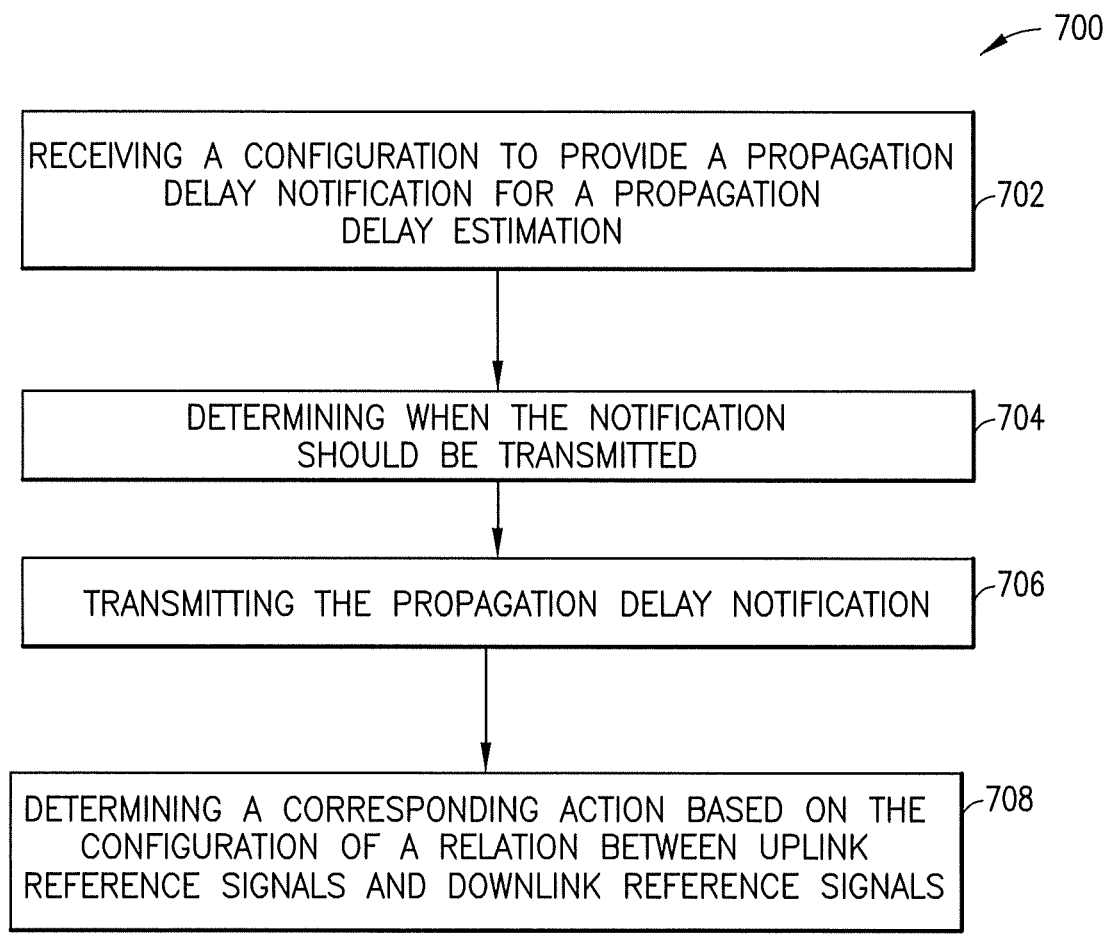
FIG. 7 shows an example method to implement a propagation delay compensation mechanism, based on the examples described herein.

FIG. 7 is an example method 700 for implementing propagation delay compensation, based on the example embodiments described herein. At 702, the method includes receiving a configuration to provide a propagation delay notification for a propagation delay estimation. At 704, the method includes determining when the notification should be transmitted. At 706, the method includes transmitting the propagation delay notification. At 708, the method includes determining a corresponding action based on the configuration of a relation between uplink reference signals and downlink reference signals. The method 700 may be performed by a user equipment, such as UE 110 of FIG. 1 or apparatus 600 of FIG. 6.

Figure 8:
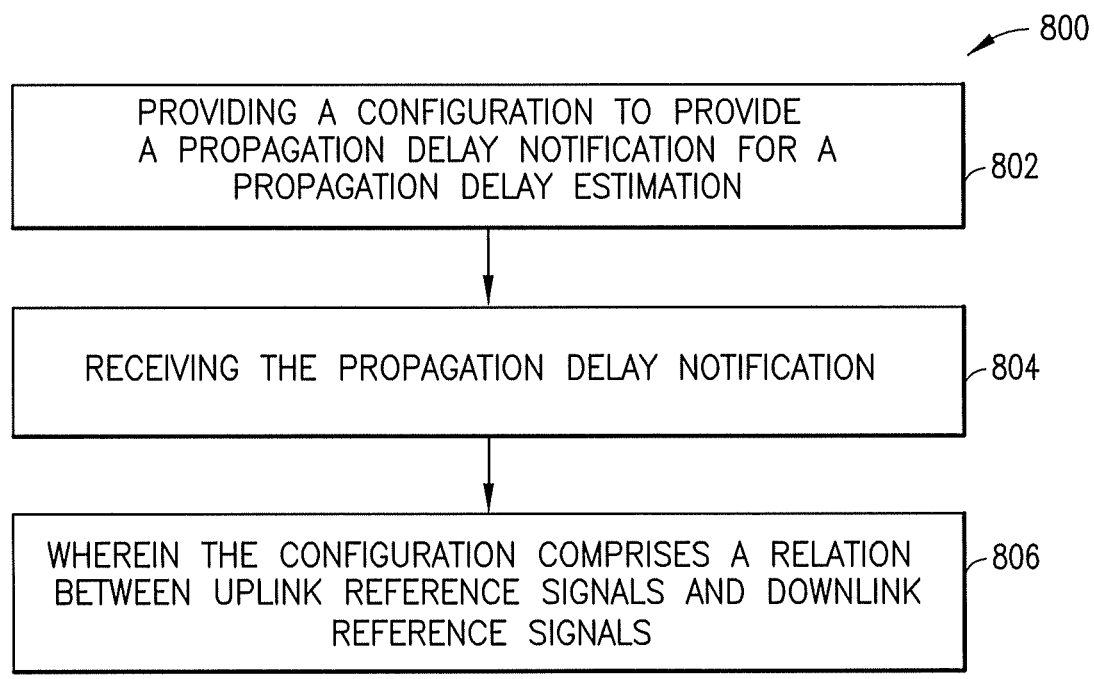
FIG. 8 shows another example method to implement a propagation delay compensation mechanism, based on the examples described herein.

FIG. 8 is another example method 800 for implementing propagation delay compensation, based on the example embodiments described herein. At 802, the method includes providing a configuration to provide a propagation delay notification for a propagation delay estimation. At 804, the method includes receiving the propagation delay notification. At 806, the method includes wherein the configuration comprises a relation between uplink reference signals and downlink reference signals. The method 800 may be performed by a radio node, such as RAN node 170 of FIG. 1 or apparatus 600 of FIG. 6.

An example method includes receiving a configuration to provide a propagation delay notification for a propagation delay estimation; determining when the notification should be transmitted; transmitting the propagation delay notification; and determining a corresponding action based on the configuration of a relation between uplink reference signals and downlink reference signals.

The method may further include transmitting an uplink reference signal to activate the propagation delay estimation.

The method may further include applying the propagation delay estimation to synchronize a time of day of a user equipment.

The method may further include in response to at least one downlink reference signal not being configured, receiving a timing adjustment message for the propagation delay estimation.

The method may further include in response to at least one downlink reference signal being configured, performing a user equipment reception and transmission timing difference measurement, and either signaling the user equipment reception and transmission timing difference measurement or receiving a radio node reception and transmission timing difference measurement for the propagation delay estimation.

The method may further include receiving a configuration of the relation between uplink reference signals and downlink reference signals as an index; determining the at least one downlink reference signal to use using the index; and transmitting the uplink reference signal to activate the propagation delay estimation based on the determined at least one downlink reference signal.

The method may further include wherein the configuration to provide the propagation delay notification comprises a propagation delay threshold used to determine whether to provide the propagation delay notification; and providing the propagation delay notification in response to a current propagation delay estimation being greater than a difference between a previously provided propagation delay estimation and the propagation delay threshold.

The method may further include wherein the propagation delay notification comprises at least one burst request and/or a desired periodicity.

The method may further include selecting the propagation delay estimate when multiple propagation delay estimates are available; wherein the multiple propagation delay estimates comprise a reception/transmission measurement and/or a timing advance.

The method may further include estimating the propagation delay as a round trip time (RTT).

The method may further include wherein the RTT is a multi-RTT with measurements from neighboring cells.

The method may further include wherein: the user equipment is idle or inactive; and the propagation delay notification is provided in response to a reference signal time difference changing more than a threshold.

The method may further include wherein the propagation delay notification is a multi-bit notification comprising an expected accuracy or an expected periodicity of measurement updates.

An example method includes providing a configuration to provide a propagation delay notification for a propagation delay estimation; and receiving the propagation delay notification; wherein the configuration comprises a relation between uplink reference signals and downlink reference signals.

The method may further include receiving an uplink reference signal to activate the propagation delay estimation.

The method may further include wherein the estimated propagation delay is applied to synchronize a time of day.

The method may further include in response to at least one downlink reference signal not being configured, providing a timing adjustment message for the propagation delay estimation.

The method may further include in response to at least one downlink reference signal being configured, performing a radio node reception and transmission timing difference measurement, and either signaling the radio node reception and transmission timing difference measurement or receiving a different reception and transmission timing difference measurement for the propagation delay estimation.

The method may further include transmitting the configuration of the relation between the uplink reference signals and downlink reference signals as an index; and receiving the uplink reference signal to activate the propagation delay estimation based on the index.

The method may further include wherein providing the propagation delay notification configuration comprises providing a propagation delay threshold; and wherein the propagation delay notification is received in response to a current propagation delay estimation being greater than a difference between a previously provided propagation delay estimation and the propagation delay threshold.

The method may further include determining the propagation delay threshold based on at least one of: an accuracy budget; and/or mobility event statistics.

The method may further include determining whether to provide the propagation delay notification configuration for the propagation delay estimation or to transmit the uplink reference signal configuration for the propagation delay estimation; wherein the determining is based on at least one of: a time synchronization accuracy requirement, device capabilities, mobility events or a timer expiry.

The method may further include wherein the propagation delay notification comprises at least one burst request and/or a desired periodicity.

The method may further include transmitting the propagation delay estimation.

The method may further include estimating the propagation delay as a round trip time (RTT).

The method may further include wherein the RTT is a multi-RTT with measurements from neighboring cells.

The method may further include broadcasting the propagation delay estimation.

The method may further include wherein: the propagation delay notification is received in response to a reference signal time difference changing more than a threshold.

The method may further include wherein the propagation delay notification is a multi-bit notification comprising an expected accuracy or an expected periodicity of measurement updates.

An example apparatus includes at least one processor; and at least one non-transitory memory including computer program code; wherein the at least one memory and the computer program code are configured to, with the at least one processor, cause the apparatus at least to perform: receive a configuration to provide a propagation delay notification for a propagation delay estimation; determine when the notification should be transmitted; transmit the propagation delay notification; and determine a corresponding action based on the configuration of a relation between uplink reference signals and downlink reference signals.

An example apparatus includes at least one processor; and at least one non-transitory memory including computer program code; wherein the at least one memory and the computer program code are configured to, with the at least one processor, cause the apparatus at least to perform: provide a configuration to provide a propagation delay notification for a propagation delay estimation; and receive the propagation delay notification; wherein the configuration comprises a relation between uplink reference signals and downlink reference signals.

An example non-transitory program storage device readable by a machine, tangibly embodying a program of instructions executable by the machine for performing operations may be provided, the operations comprising: receiving a configuration to provide a propagation delay notification for a propagation delay estimation; determining when the notification should be transmitted; transmitting the propagation delay notification; and determining a corresponding action based on the configuration of a relation between uplink reference signals and downlink reference signals.

An example non-transitory program storage device readable by a machine, tangibly embodying a program of instructions executable by the machine for performing operations may be provided, the operations comprising: providing a configuration to provide a propagation delay notification for a propagation delay estimation; and receiving the propagation delay notification; wherein the configuration comprises a relation between uplink reference signals and downlink reference signals.

An example apparatus includes circuitry configured to receive a configuration to provide a propagation delay notification for a propagation delay estimation; circuitry configured to determine when the notification should be transmitted; circuitry configured to transmit the propagation delay notification; and circuitry configured to determine a corresponding action based on the configuration of a relation between uplink reference signals and downlink reference signals.

An example apparatus includes circuitry configured to provide a configuration to provide a propagation delay notification for a propagation delay estimation; and circuitry configured to receive the propagation delay notification; wherein the configuration comprises a relation between uplink reference signals and downlink reference signals.

An example apparatus includes means for receiving a configuration to provide a propagation delay notification for a propagation delay estimation; means for determining when the notification should be transmitted; means for transmitting the propagation delay notification; and means for determining a corresponding action based on the configuration of a relation between uplink reference signals and downlink reference signals.

An example apparatus includes means for providing a configuration to provide a propagation delay notification for a propagation delay estimation; and means for receiving the propagation delay notification; wherein the configuration comprises a relation between uplink reference signals and downlink reference signals.

It should be understood that the foregoing description is only illustrative. Various alternatives and modifications may be devised by those skilled in the art. For example, features recited in the various dependent claims could be combined with each other in any suitable combination(s). In addition, features from different embodiments described above could be selectively combined into a new embodiment. Accordingly, the description is intended to embrace all such alternatives, modifications and variances which fall within the scope of the appended claims.

What is claimed is:

1. A method comprising:
   receiving a configuration to provide a propagation delay notification for a propagation delay estimation;
   wherein the configuration to provide the propagation delay notification comprises a propagation delay threshold used to determine whether to provide the propagation delay notification;
   determining when the notification should be transmitted;
   transmitting the propagation delay notification;
   providing the propagation delay notification in response to a current propagation delay estimation being greater than a difference between a previously provided propagation delay estimation and the propagation delay threshold; and
   determining a corresponding action based on the configuration of a relation between uplink reference signals and downlink reference signals.

2. The method of claim 1, further comprising transmitting an uplink reference signal to activate the propagation delay estimation.

3. The method of claim 1, further comprising applying the propagation delay estimation to synchronize a time of day of a user equipment.

4. The method of claim 1, further comprising:
   in response to at least one downlink reference signal not being configured, receiving a timing adjustment message for the propagation delay estimation.

5. The method of claim 1, further comprising:
   in response to at least one downlink reference signal being configured, performing a user equipment reception and transmission timing difference measurement, and either signaling the user equipment reception and transmission timing difference measurement or receiving a radio node reception and transmission timing difference measurement for the propagation delay estimation.

6. The method of claim 5, further comprising:
   receiving a configuration of the relation between uplink reference signals and downlink reference signals as an index;
   determining the at least one downlink reference signal to use using the index; and
   transmitting the uplink reference signal to activate the propagation delay estimation based on the determined at least one downlink reference signal.

7. The method of claim 1, wherein the propagation delay notification comprises at least one burst request and/or a desired periodicity.

8. The method of claim 7, wherein the RTT is a multi-RTT with measurements from neighboring cells.

9. The method of claim 1, further comprising:
   selecting the propagation delay estimate when multiple propagation delay estimates are available;
   wherein the multiple propagation delay estimates comprise a reception/transmission measurement and/or a timing advance.

10. The method of claim 1, further comprising estimating the propagation delay as a round trip time (RTT).

11. The method of claim 1, wherein:
    the user equipment is idle or inactive; and
    the propagation delay notification is provided in response to a reference signal time difference changing more than a threshold.

12. The method of claim 1, wherein the propagation delay notification is a multi-bit notification comprising an expected accuracy or an expected periodicity of measurement updates.

13. A method comprising:
    providing a configuration to provide a propagation delay notification for a propagation delay estimation;
    wherein providing the configuration to provide the propagation delay notification comprises providing a propagation delay threshold; and
    receiving the propagation delay notification;
    wherein the propagation delay notification is received in response to a current propagation delay estimation being greater than a difference between a previously provided propagation delay estimation and the propagation delay threshold;
    wherein the configuration comprises a relation between uplink reference signals and downlink reference signals.

14. The method of claim 13, further comprising receiving an uplink reference signal to activate the propagation delay estimation.

15. The method of claim 13, wherein the estimated propagation delay is applied to synchronize a time of day.

16. The method of claim 13, further comprising:
    in response to at least one downlink reference signal not being configured, providing a timing adjustment message for the propagation delay estimation.

17. The method of claim 13, further comprising:
    in response to at least one downlink reference signal being configured, performing a radio node reception and transmission timing difference measurement, and either signaling the radio node reception and transmission timing difference measurement or receiving a different reception and transmission timing difference measurement for the propagation delay estimation.

18. The method of claim 13, further comprising:
    transmitting the configuration of the relation between the uplink reference signals and downlink reference signals as an index; and
    receiving the uplink reference signal to activate the propagation delay estimation based on the index.

19. The method of claim 13, further comprising:
    determining the propagation delay threshold based on at least one of: an accuracy budget; and/or mobility event statistics.

20. The method of claim 13, further comprising:
    determining whether to provide the configuration to provide the propagation delay notification for the propagation delay estimation or to transmit an uplink reference signal configuration for the propagation delay estimation;
    wherein the determining is based on at least one of: a time synchronization accuracy requirement, device capabilities, mobility events or a timer expiry.

21. The method of claim 13, wherein the propagation delay notification comprises at least one burst request and/or a desired periodicity.

22. The method of claim 13, further comprising transmitting the propagation delay estimation.

23. The method of claim 13, further comprising estimating the propagation delay as a round trip time (RTT).

24. The method of claim 23, wherein the RTT is a multi-RTT with measurements from neighboring cells.

25. The method of claim 13, further comprising broadcasting the propagation delay estimation.

26. The method of claim 13, wherein:
the propagation delay notification is received in response to a reference signal time difference changing more than a threshold.

27. The method of claim 13, wherein the propagation delay notification is a multi-bit notification comprising an expected accuracy or an expected periodicity of measurement updates.

28. An apparatus comprising:
at least one processor; and
at least one non-transitory memory including computer program code;
wherein the at least one memory and the computer program code are configured to, with the at least one processor, cause the apparatus at least to:
receive a configuration to provide a propagation delay notification for a propagation delay estimation;
wherein the configuration to provide the propagation delay notification comprises a propagation delay threshold used to determine whether to provide the propagation delay notification;
determine when the notification should be transmitted;
transmit the propagation delay notification;
provide the propagation delay notification in response to a current propagation delay estimation being greater than a difference between a previously provided propagation delay estimation and the propagation delay threshold; and
determine a corresponding action based on the configuration of a relation between uplink reference signals and downlink reference signals.

29. A non-transitory program storage device readable by a machine, tangibly embodying a program of instructions executable with the machine for performing operations, the operations comprising:
receiving a configuration to provide a propagation delay notification for a propagation delay estimation;
wherein the configuration to provide the propagation delay notification comprises a propagation delay threshold used to determine whether to provide the propagation delay notification;
determining when the notification should be transmitted;
transmitting the propagation delay notification;
providing the propagation delay notification in response to a current propagation delay estimation being greater than a difference between a previously provided propagation delay estimation and the propagation delay threshold; and
determining a corresponding action based on the configuration of a relation between uplink reference signals and downlink reference signals.

30. A non-transitory program storage device readable by a machine, tangibly embodying a program of instructions executable with the machine for performing operations, the operations comprising:
providing a configuration to provide a propagation delay notification for a propagation delay estimation;
wherein providing the configuration to provide the propagation delay notification comprises providing a propagation delay threshold; and
receiving the propagation delay notification;
wherein the propagation delay notification is received in response to a current propagation delay estimation being greater than a difference between a previously provided propagation delay estimation and the propagation delay threshold;
wherein the configuration comprises a relation between uplink reference signals and downlink reference signals.

31. An apparatus comprising:
at least one processor; and
at least one non-transitory memory including computer program code;
wherein the at least one memory and the computer program code are configured to, with the at least one processor, cause the apparatus at least to:
provide a configuration to provide a propagation delay notification for a propagation delay estimation;
wherein providing the configuration to provide the propagation delay notification comprises providing a propagation delay threshold; and
receive the propagation delay notification;
wherein the propagation delay notification is received in response to a current propagation delay estimation being greater than a difference between a previously provided propagation delay estimation and the propagation delay threshold;
wherein the configuration comprises a relation between uplink reference signals and downlink reference signals.

* * * * *